(12) United States Patent
Cassidy

(10) Patent No.: US 9,015,588 B2
(45) Date of Patent: Apr. 21, 2015

(54) ADVANCED PLAYBACK QUEUE MANAGEMENT

(75) Inventor: Brendon P. Cassidy, Los Angeles, CA (US)

(73) Assignee: AT&T Mobility II LLC, Atlanta, GA (US)

(*) Notice: Subject to any disclaimer, the term of this patent is extended or adjusted under 35 U.S.C. 154(b) by 15 days.

(21) Appl. No.: 13/158,287

(22) Filed: Jun. 10, 2011

(65) Prior Publication Data

US 2012/0089910 A1 Apr. 12, 2012

Related U.S. Application Data

(60) Provisional application No. 61/353,606, filed on Jun. 10, 2010, provisional application No. 61/394,209, filed on Oct. 18, 2010, provisional application No. 61/394,222, filed on Oct. 18, 2010, provisional application No. 61/425,192, filed on Dec. 20, 2010, provisional application No. 61/430,004, filed on Jan. 5, 2011.

(51) Int. Cl.
*G06F 3/00* (2006.01)
*H04N 21/472* (2011.01)
*H04L 12/805* (2013.01)
*H04N 21/262* (2011.01)

(52) U.S. Cl.
CPC .............. *H04L 47/36* (2013.01); *H04N 21/472* (2013.01); *H04N 21/26258* (2013.01)

(58) Field of Classification Search
None
See application file for complete search history.

(56) References Cited

U.S. PATENT DOCUMENTS

| | | |
|---|---|---|
| 6,813,733 B1 | 11/2004 | Li et al. |
| 6,990,638 B2 | 1/2006 | Barksdale et al. |
| 7,216,301 B2 | 5/2007 | Moehrle |

(Continued)

FOREIGN PATENT DOCUMENTS

| | | |
|---|---|---|
| JP | 2009-053702 A | 3/2009 |
| JP | 2009-075987 A | 4/2009 |

(Continued)

OTHER PUBLICATIONS

U.S. Appl. No. 13/078,865 Patent Application filed Apr. 1, 2011.

(Continued)

*Primary Examiner* — Matt Kim
*Assistant Examiner* — Hua Lu
(74) *Attorney, Agent, or Firm* — Wilson Sonsini Goodrich & Rosati

(57) ABSTRACT

Methods, systems, apparatus and non-transitory computer readable-media are described for creating and/or maintaining a playback queue of media content. In one aspect, a computer-implemented method of providing playback of media content includes receiving a request from a mobile communications device associated with a user to browse a media archive. A user selection of a category and a request to initiate management of a playback queue are received. A media listing is generated responsive to the received request. A user selection of one or more items of media content from the generated media listing is received. One or more playback queue options for the user selected items of media content are presented. A user selection of one of the presented one or more playback queue options is received. The user selected items of media content are manipulated to update the playback queue responsive to the received user selected playback queue option.

18 Claims, 10 Drawing Sheets

(56) References Cited

U.S. PATENT DOCUMENTS

| | | | |
|---|---|---|---|
| 7,466,807 B2 | 12/2008 | McCann et al. | |
| 7,596,761 B2 | 9/2009 | Lemay et al. | |
| 7,706,778 B2 | 4/2010 | Lowe | |
| 8,161,411 B2 | 4/2012 | Robbin et al. | |
| 8,171,419 B2 | 5/2012 | Mujkic et al. | |
| 8,254,829 B1 | 8/2012 | Kindred et al. | |
| 8,290,471 B1 | 10/2012 | Jones et al. | |
| 2002/0069037 A1 | 6/2002 | Hendrickson et al. | |
| 2002/0100052 A1 | 7/2002 | Daniels | |
| 2002/0147728 A1 | 10/2002 | Goodman et al. | |
| 2005/0021470 A1* | 1/2005 | Martin et al. | 705/51 |
| 2005/0073991 A1 | 4/2005 | Roberts et al. | |
| 2005/0132018 A1 | 6/2005 | Milic-Frayling et al. | |
| 2005/0132297 A1 | 6/2005 | Milic-Frayling et al. | |
| 2006/0019632 A1 | 1/2006 | Cunningham et al. | |
| 2006/0101350 A1 | 5/2006 | Scott | |
| 2006/0184897 A1 | 8/2006 | Young Suk Lee | |
| 2006/0280050 A1 | 12/2006 | Miles et al. | |
| 2006/0288112 A1* | 12/2006 | Soelberg et al. | 709/231 |
| 2007/0033402 A1 | 2/2007 | Williams et al. | |
| 2007/0100834 A1 | 5/2007 | Landry et al. | |
| 2007/0198746 A1 | 8/2007 | Myllyla et al. | |
| 2008/0004978 A1 | 1/2008 | Rothschild | |
| 2008/0005179 A1 | 1/2008 | Friedman et al. | |
| 2008/0040028 A1 | 2/2008 | Crump | |
| 2008/0059908 A1* | 3/2008 | Arvilommi | 715/841 |
| 2008/0059909 A1 | 3/2008 | Parada et al. | |
| 2008/0059911 A1 | 3/2008 | Kulo et al. | |
| 2008/0189255 A1* | 8/2008 | Zatloukal et al. | 707/3 |
| 2008/0194276 A1 | 8/2008 | Lin et al. | |
| 2008/0194296 A1 | 8/2008 | Roundtree | |
| 2009/0017860 A1 | 1/2009 | Cole | |
| 2009/0018898 A1 | 1/2009 | Genen | |
| 2009/0076881 A1 | 3/2009 | Svendsen | |
| 2009/0132453 A1* | 5/2009 | Hangartner et al. | 706/46 |
| 2009/0157842 A1 | 6/2009 | Shaffer et al. | |
| 2009/0182546 A1 | 7/2009 | Gentric | |
| 2009/0257804 A1 | 10/2009 | Manico et al. | |
| 2009/0287841 A1 | 11/2009 | Chapweske et al. | |
| 2009/0307135 A1 | 12/2009 | Gupta et al. | |
| 2010/0022270 A1 | 1/2010 | Mikkelsen et al. | |
| 2010/0031288 A1 | 2/2010 | Scott et al. | |
| 2010/0031366 A1* | 2/2010 | Knight et al. | 726/26 |
| 2010/0049862 A1 | 2/2010 | Dixon | |
| 2010/0057852 A1 | 3/2010 | Barile | |
| 2010/0082448 A1 | 4/2010 | Lin et al. | |
| 2010/0111278 A1 | 5/2010 | Trimborn et al. | |
| 2010/0113065 A1 | 5/2010 | Narayan et al. | |
| 2010/0169832 A1 | 7/2010 | Chang | |
| 2010/0185776 A1 | 7/2010 | Hosur et al. | |
| 2010/0235476 A1 | 9/2010 | Lin et al. | |
| 2010/0311391 A1 | 12/2010 | Siu et al. | |
| 2010/0324977 A1 | 12/2010 | Dragt | |
| 2011/0060764 A1 | 3/2011 | Lourdeaux | |
| 2011/0066633 A1* | 3/2011 | Naftolin et al. | 707/769 |
| 2011/0082572 A1 | 4/2011 | Ramakrishnan et al. | |
| 2011/0087665 A1 | 4/2011 | Weare | |
| 2011/0087690 A1 | 4/2011 | Cairns | |
| 2011/0093913 A1 | 4/2011 | Wohlert et al. | |
| 2011/0111278 A1 | 5/2011 | Ghosh et al. | |
| 2011/0141887 A1 | 6/2011 | Klein et al. | |
| 2011/0158406 A1 | 6/2011 | Marcia et al. | |
| 2011/0185278 A1* | 7/2011 | Flickinger et al. | 715/727 |
| 2011/0196953 A1 | 8/2011 | Samaha | |
| 2011/0251995 A1 | 10/2011 | Hangartner et al. | |
| 2011/0304685 A1 | 12/2011 | Khedouri et al. | |
| 2012/0022967 A1 | 1/2012 | Bachman et al. | |
| 2012/0059748 A1 | 3/2012 | Matsuo et al. | |
| 2012/0059910 A1 | 3/2012 | Cassidy | |
| 2012/0088477 A1 | 4/2012 | Cassidy | |
| 2012/0089951 A1 | 4/2012 | Cassidy | |
| 2012/0096056 A1 | 4/2012 | Thomas | |
| 2012/0109997 A1 | 5/2012 | Sparks et al. | |
| 2012/0110074 A1 | 5/2012 | Getchius | |
| 2012/0117026 A1 | 5/2012 | Cassidy | |
| 2012/0117185 A1 | 5/2012 | Cassidy | |
| 2012/0117197 A1 | 5/2012 | Cassidy | |
| 2012/0117620 A1 | 5/2012 | Cassidy et al. | |
| 2012/0124162 A1 | 5/2012 | Cassidy | |
| 2012/0124177 A1 | 5/2012 | Sparks | |
| 2012/0149338 A1 | 6/2012 | Roundtree | |
| 2012/0203871 A1 | 8/2012 | Svendsen | |
| 2013/0094402 A1 | 4/2013 | Muhamed et al. | |
| 2013/0189942 A1 | 7/2013 | Vendrow et al. | |

FOREIGN PATENT DOCUMENTS

| | | |
|---|---|---|
| KR | 10-2004-0095934 A | 11/2004 |
| KR | 10-2006-0129330 A | 12/2006 |
| KR | 10-2009-0013259 A | 2/2009 |
| WO | WO 2010/128442 A2 | 11/2010 |
| WO | WO 2011/156785 | 3/2012 |

OTHER PUBLICATIONS

U.S. Appl. No. 13/045,409 Office Action mailed May 23, 2014.
U.S. Appl. No. 13/045,409 Office Action mailed Jan. 2, 2014.
U.S. Appl. No. 13/280,277 Office Action mailed Oct. 15, 2013.
U.S. Appl. No. 13/280,277 Office Action mailed Feb. 14, 2013.
U.S. Appl. No. 13/078,865 Office Action mailed Aug. 30, 2012.
U.S. Appl. No. 13/078,865 Office Acton mailed Jun. 13, 2013.
U.S. Appl. No. 13/078,865 Office Action mailed Sep. 11, 2014.
U.S. Office Action dated Aug. 30, 2013 in U.S. Appl. No. 13/158,300.
U.S. Office Action dated Nov. 28, 2012 in U.S. Appl. No. 13/158,300.
U.S. Appl. No. 13/158,319 Office Action mailed Jul. 26, 2013.
U.S. Appl. No. 13/158,319 Office Action mailed Jan. 8, 2013.
U.S. Appl. No. 13/158,319 Office Action mailed Oct. 10, 2014.
U.S. Appl. No. 13/158,321 Office Action mailed Jul. 29, 2014.
U.S. Appl. No. 13/158,321 Office Action mailed Jan. 21, 2014.
U.S. Appl. No. 13/158,321 Office Action mailed Jun. 12, 2013.
U.S. Appl. No. 13/158,321 Office Action mailed Oct. 30, 2012.
U.S. Appl. No. 13/158,326 Office Action mailed Sep. 25, 2014.
U.S. Appl. No. 13/158,326 Office Action mailed Feb. 26, 2014.
U.S. Appl. No. 13/158,326 Office Action mailed Jul. 3, 2013.
U.S. Appl. No. 13/158,326 Office Action mailed Oct. 25, 2012.
U.S. Appl. No. 13/158,329 Office Action mailed Sep. 22, 2014.
U.S. Appl. No. 13/158,329 Office Action mailed Jul. 25, 2013.
U.S. Appl. No. 13/158,329 Office Action mailed Nov. 21, 2012.
U.S. Appl. No. 13/158,333 Office Action mailed Sep. 24, 2013.
U.S. Appl. No. 13/158,333 Office Action mailed Jan. 7, 2013.
U.S. Appl. No. 13/158,334 Notice of Allowance mailed Mar. 17, 2014.
U.S. Appl. No. 13/158,334 Office Action mailed Sep. 5, 2013.
U.S. Appl. No. 13/158,334 Office Action mailed Dec. 6, 2012.
PCT/US2011/040080 International Search Report dated Feb. 9, 2012.
PCT/US2011/040080 Written Opinion dated Feb. 9, 2012.
EP11793289.7 European Search Opinion and Supplemental European Search Report dated Apr. 4, 2014.
PCT/US2011/040086 International Search Report dated Feb. 9, 2012.
PCT/US2011/040086 Written Opinion dated Jan. 30, 2012.
PCT/US2011/040088 International Search Report dated Feb. 9, 2012.
PCT/US2011/040088 Written Opinion dated Jan. 31, 2012.
Paul Douglas, "30 Google Chrome tips, tricks and shortcuts," Sep. 12, 2008, TechRadar, available at <http://web.archive.org/web/20080912065612/http://www.techradar.com/news/internet/web/30-goog le-chrome-tips-tricksandshortcuts-462663>.
"The Invisible Browser," Sep. 5, 2008, Google Operating System, available at <http://web.archive.org/web/20080905215028/http://googlesystem.blogspot.com/2008/09/invisible-browser.html>.
U.S. Appl. No. 13/280,277 Office Action mailed Oct. 21, 2014.
U.S. Appl. No. 13/158,300 Office Action mailed Jan. 28, 2015.
U.S. Appl. No. 13/158,333 Office Action mailed Nov. 3, 2014.

* cited by examiner

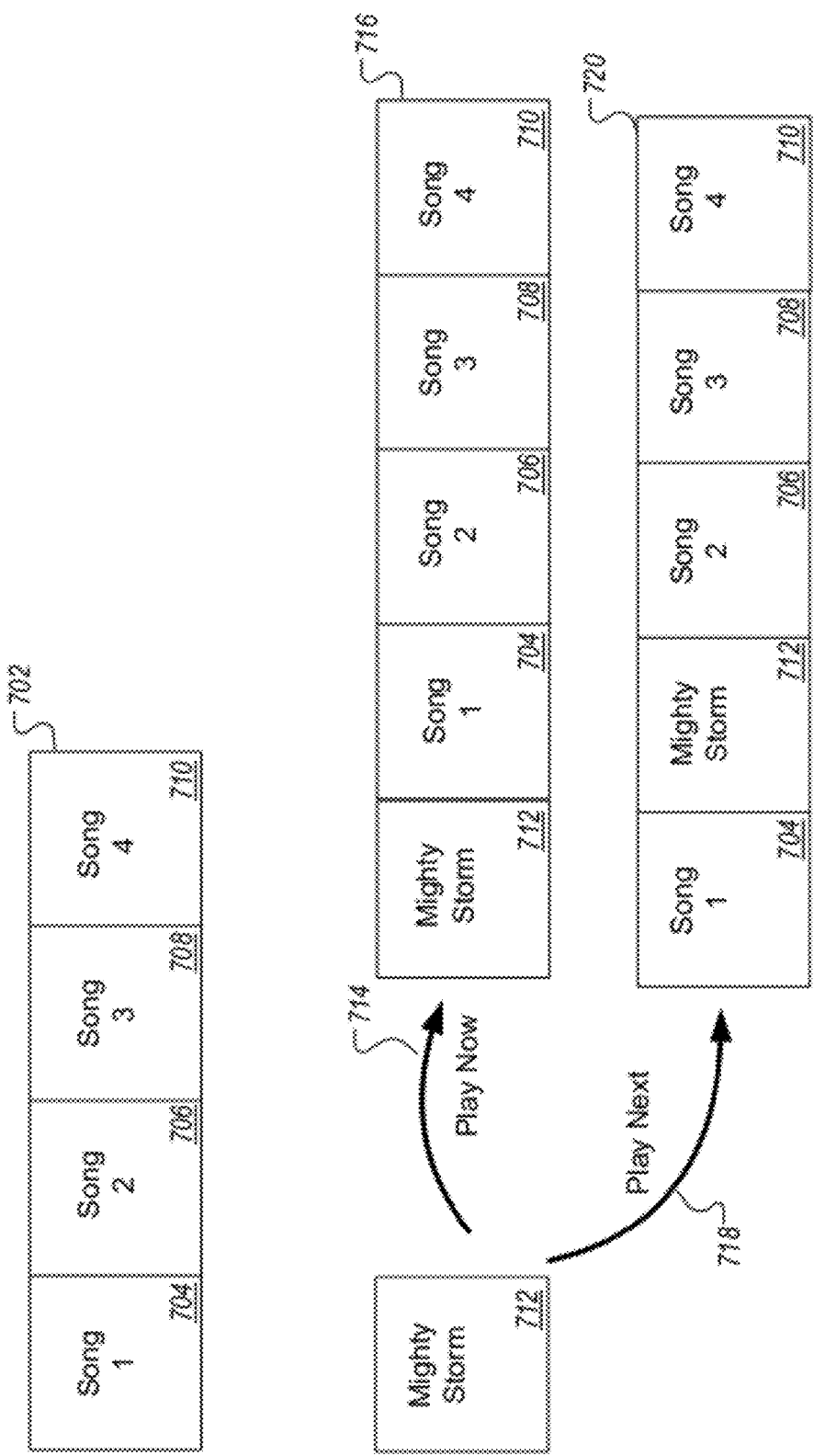

ADVANCED PLAYBACK QUEUE MANAGEMENT

This application claims priority under 35 U.S.C. §119(e) to Provisional Patent Application No. 61/353,606 entitled "Unlimited Media Access Over Wireless Infrastructure" filed Jun. 10, 2010, to Provisional Patent Application No. 61/394, 209 entitled "Mobile Handset For Media Access And Playback filed Oct. 18, 2010, to Provisional Patent Application No. 61/394,222 entitled "Media Server Providing Unlimited Media Access Over Wireless Infrastructure" filed Oct. 18, 2010, to Provisional Patent Application No. 61/430,004 entitled "Advanced Playback Queue Management" filed Jan. 5, 2011, and to Provisional Patent Application No. 61/425, 192 entitled " Unlimited Media Access Over Wireless Infrastructure" filed Dec. 20, 2010, the contents of all five of which are incorporated herein by reference.

BACKGROUND

This application relates to providing unlimited access to media, such as music and ring tones, to a mobile handset over wireless infrastructure, and to managing the unlimited access to media, local storage of accessed media, and local playback of media from the mobile handset.

Mobile communications devices have been adapted to a wide variety of applications, including computing, communication, and entertainment. For example, mobile communications devices permit users to freely initiate and receive voice communications, e.g. through dial-up connections or push-to-talk. Further, mobile communications devices have been developed to provide users with access to data communications through wireless connectivity, such as over Institute of Electrical and Electronic Engineers (IEEE) 802.11 or 3G/4G networks. Data communications can provide a user with access to a wide variety of entertainment options, including audio, video, and gaming content.

Services have been developed which permit a user to load media content, e.g. music and videos, onto a mobile communications device for subsequent playback. For instance, media content can be purchased from an on-line source, such as in accordance with a pay-per-song model. Purchased media content can be downloaded to a computing device, such a desktop or a laptop. Further, the content can be transferred off-line to from the computing device to a mobile communications device, e.g. through a sync (or synchronization) procedure. The media content can then be played back on the mobile communications device using a playback application. Once the media content is no longer desired on the mobile communications device, it can be deleted. Accordingly, media device functionality, e.g. an MP3 player, can be incorporated into a mobile communications device.

Internet radio (or web radio or streaming radio) also has been developed to stream music over a network, such as the internet, to receivers that can play the streamed content. Internet radio typically is implemented similar to traditional broadcast radio in that the streamed content cannot be paused or replayed. Further, channels can be programmed to feature a particular style, type, or genre of content, but cannot be programmed by the listener. Additionally, the streamed content is not persistently stored on the receiver, so play back is possible only when a connection to the streaming source is available.

SUMMARY

A mobile communications device (or "handset") can be configured to operate in conjunction with a service structured to provide a subscriber with unlimited access to and/or unlimited use of media content. Unlimited access and/or unlimited use can be truly unlimited, such that no restrictions are placed on the amount of media that can be downloaded in a given period, e.g. a week or a month. Alternatively, unlimited access and/or unlimited use can be structured to impose one or more restrictions, such as a limitation on network traffic, e.g. measured in megabytes or gigabytes, over a given period, e.g. an hour or a day. The media content can include one or more of audio content (e.g. music), video content (e.g. television, movies, shorts), text-based content (e.g., e-books), and any combination thereof. Additionally, media content structured for use in communications, e.g. ring tones and ring back tones, also can be accessed by the mobile communications device.

Unlimited access to media content also can be provided in conjunction with one or more communications services, including one or more of voice communications, text communications, and data communications. The mobile communications device can be adapted to provide access both to the media content and to the communications services. For instance, the mobile communications device can be associated with a subscription to a single, unlimited-use offering that includes access to media content and one or more communications services.

The present inventors recognized a need to provide a mobile communications device configured to provide access to a local media archive and a remote media archive. The need to permit using the mobile communications device to select media, such as one or more songs, for download from the remote media archive to the local media archive also was recognized. Further, the present inventors recognized the need to permit adding one or more items of media to a play queue or a play list for local playback on the mobile communications device. The need to augment or revise a play queue or play list, including during playback, also was recognized. Additionally, the present inventors recognized the need to provide random playback from a local media archive, wherein media is selected for playback in accordance with one or more metrics associated with subscriber playback history.

The present inventors also recognized the need to permit switching the interface presented by the mobile communications device directly from a view of a media item included in the local media archive to a corresponding view of the media item in the remote media archive. Also, the need to perform digital rights management (DRM) at the storage media level for the local music archive was recognized. Further, the need to provide a secure, removable storage medium, e.g. a memory card, on which the local media archive can be stored also was recognized.

The techniques described in this specification can be implemented to realize one or more of the following advantages. The techniques can be implemented such that a mobile communications device can store locally an archive of media based on a subscription plan instead of a pay-per-download model. The techniques also can be implemented to permit authorizing a user to access media on the mobile communications device based on having an active subscription. Further, the techniques can be implemented to permit automatically altering one or more items of media stored on the mobile communications device based on one or more play lists. For instance, a play list can be altered periodically, e.g. weekly, and music included in the play list that is not presently stored on the mobile communications device can be automatically downloaded to the mobile communications device.

The details of one or more implementations are set forth in the accompanying drawings and the description below. Other features and advantages will be apparent from the description and drawings, and from the claims.

BRIEF DESCRIPTION OF THE DRAWINGS

Like reference symbols and designations in the various drawings indicate like elements.

DETAILED DESCRIPTION

Techniques, apparatus, systems and non-transitory computer-readable media are described for providing unlimited access to items of media content, such as music and ring tones, to a mobile communications device over wireless infrastructure, and to managing the unlimited access to media, local storage of accessed media, and local playback of media from the mobile communications device. In one aspect, a customized playback queue ("SuperPlay") can be constructed and maintained by a user. The customized playback queue can be invoked through any interface that includes a user selectable icon or command button, for example.

Figure 1:
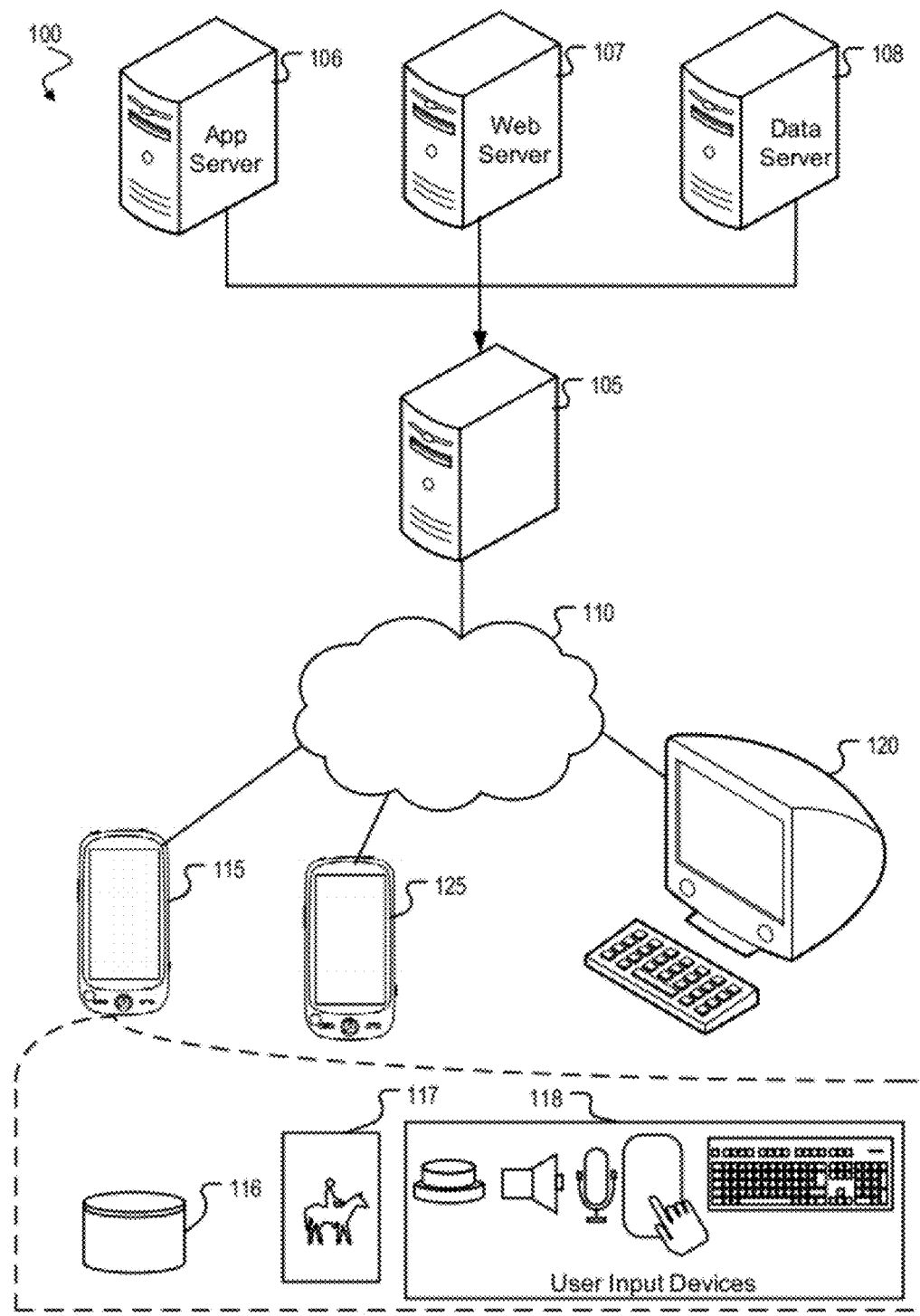
FIG. 1 shows an exemplary computing environment in which media can be transferred to a mobile communications device and included in a customized playback queue.

FIG. 1 shows an exemplary computing environment in which media can be transferred to a mobile communications device and included in a customized playback queue. Computing environment 100 can include a server 105 (or "the cloud") configured to provide access to and management of media content. Server 105 can be implemented using a single computing device or multiple computing devices, which can be co-located or distributed across two or more locations. For instance, in some implementations, server 105 can be implemented using one or more application servers 106, web servers 107, and data servers 108, which can be housed in one or more locations.

Server 105 can host one or more applications configured to manage subscribing users. For instance, server 105 can be configured to validate a user or a mobile communications device before the user or the device is authorized to perform media related functions, including accessing locally stored media (on the communications device) and downloading media from server 105. Further, server 105 can maintain an instance of one or more user accounts, including user account details, e.g. mobile identification number and subscriber name, locally stored music, subscribed play lists, managed play lists, play back history, and contacts information. Server 105 also can host a media catalog (or media archive), which can be accessed by subscribing users or mobile communications devices to select items of media content for download to the mobile communications devices. The downloaded media content can be presented to the subscribing users using customized playback queues. Additionally, server 105 can be configured to manage the transfer of media to one or more subscribing mobile communications devices, including the transfer of specifically requested media and the automated transfer of media associated with a subscribed collection, such as a play list. Any items of media content associated with a play list can be selected for playback using a customized playback queue. The techniques for creating and maintaining a customized playback queue are described below.

Server 105 can be adapted to communicate with subscribing users over a network 110, which can be implemented using one or more data networks. For instance, network 110 can include either or both of wired and wireless communication links. Further, network 110 can be a public network, e.g. the internet, a private network, e.g. a cellular data network, or a combination thereof. Network 110 also can include one or more gateways, which facilitate the transfer of data between devices using different protocols. Further, network 110 can include either or both of secure links and unsecure links. Additionally, network 110 can include network infrastructure provided by multiple parties, such as a host network and one or more partner networks, e.g. roaming partners.

One or more mobile communications devices 115 associated with subscribing users also can be configured to communicate over network 110, e.g. with server 105 and with other mobile communications devices 125. In some implementations, the other mobile communications devices 125 need not be associated with other subscribing users. Any number of mobile communications devices 115 can be included in computing environment 100. As the number of mobile communications devices 115 increases, server 105 and network 110 can be scaled, e.g. by adding additional resources, to provide an acceptable level of service. A mobile communications device 115 can be any mobile device configured to communicate over the network 110 with a host service provider, e.g. server 105. For instance, a mobile communications device 115 can be a mobile telephone that is adapted to transmit and receive data communications, e.g., a smart phone, a personal digital assistant, a tablet computing device, a mini-computer, a micro-computer, a notebook computer, a laptop, or any other such computing device.

In addition to communicating with the server 105, a mobile communications device 115 can be configured to communicate wirelessly over a cellular network. For instance, the mobile communications device 115 can be associated with a subscription to an unlimited use communications plan that provides access to any or all of voice communications, text, and data communications. In some implementations, a subscription permitting unlimited access to media can be bundled with a communications plan for a single price, such as a communications plan that offers one or more unlimited communications services or a communications plan that provides a fixed amount of service, e.g. minutes or units of data, for a set fee. Moreover, any of the subscription plans can be implemented as a prepaid, partially prepaid, or post-paid plan. The items of media content obtained through above described unlimited media access can be included in a customized playback queue for user customized playback.

A mobile communications device 115 further can include a data storage device 116 configured to receive and store media content. The data storage device 116 can be adapted to provide secure storage for the media content, as well as to perform digital rights management functions, e.g. decrypting media content for playback on the mobile communications device 115. In some implementations, the data storage device 116 can be a removable device, e.g. a flash memory module. Thus, a local media library can be stored across multiple data storage devices, which can be swapped to provide access to different portions of the library.

A mobile communications device 115 also can include a display 117, e.g. a liquid crystal display (LCD) or a light emitting diode (LED) display, and one or more user input devices 118, such as a touch screen (resistive or capacitive), a touch pad, one or more buttons, one or more keys, a scroll wheel, a dial, a switch, a microphone, or any other such input device. Further, a mobile communications device 115 can be adapted to communicate using one or more protocols, such as 3G, Wi-Fi, or other such protocols. For instance, a mobile communications device 115 can be configured to communicate over Wi-Fi when possible and otherwise to use a 3G connection.

Additionally, computing environment 100 can include one or more computing systems 120. A computing system 120 can be implemented using a computing device, such as a desktop computer, a laptop computer, a notebook computer, a net book, a tablet computing device, a workstation, and a server. Computing system 120 also can be configured to transmit and receive data over network 110, e.g. over a TCP/IP connection. Thus, computing system 120 can be adapted to provide data communications with server 105. For instance, computing system 120 can be used to perform functions relating to a subscribing user's account, such as account management and the selection of media.

Figure 2:
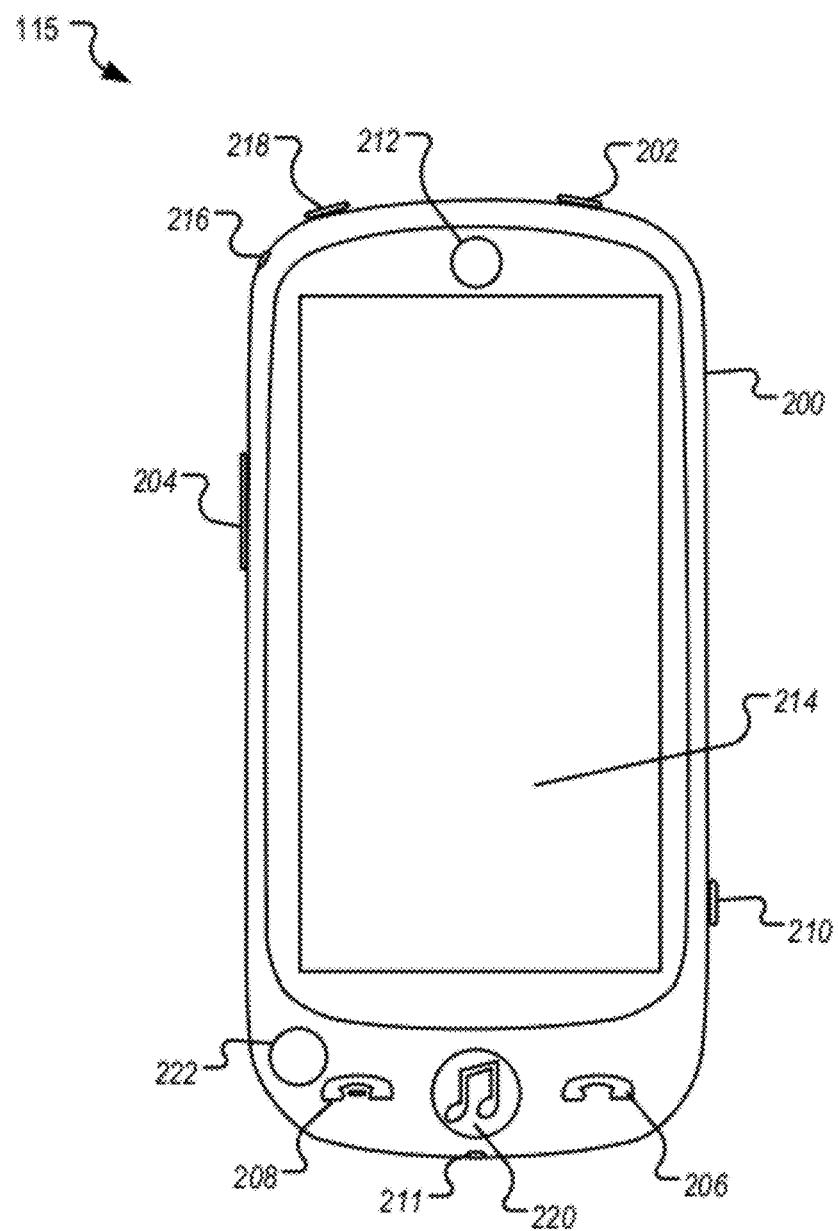
FIG. 2 shows an exemplary mobile communications device.

FIG. 2 shows an exemplary mobile communications device. Mobile communications device 200 can be configured to provide wireless voice communication and data communication. The device 200 can include physical controls, e.g. a power button 202, a volume control 204, a phone button 206, an end call button 208, and a camera button 210. Further, the device 200 can include inputs and outputs, such as microphone 211, speaker 212 and display 214, which can be a touch sensitive display, e.g. resistive or capacitive. Display 214 can be configured to sense either or both of simple gestures and complex gestures, such as multi-touch gestures. In some implementations, the device 200 also can include one or more additional speakers 216 configured to output additional audio output, such as voice and/or music. The one or more speakers can be located on any or all of the peripheral edges, the back, and the front of the device 200. One or more of the included speakers, e.g. the one or more speakers 216, can be used to implement audio playback and/or speakerphone functionality. For example, using a customized playback queue, items of media content can be played back to the user through the one or more speakers. An accessory jack 218, e.g. for headphones, also can be included. Further, the device 200 can have an integrated digital signal processor (DSP) that can provide for customized tuning of audio output. For example, the DSP can be adapted to provide a graphic equalizer, e.g. a five-band equalizer, to allow pinpoint sound control, and a dynamics processor to provide multi-band compression and limiting. One or more preconfigured options and one or more custom options can be used to specify the audio levels for each of the equalizer's bands. Compression can be configurable using predetermined levels, e.g. off, low, medium and high, which can correspond to software configured bundles of parameters for the compressor's various level, ratio, attack and decay parameters for each band. Also, one or more frequencies that cannot be reproduced by a given output device, e.g. the integrated speaker(s), can be rolled-off. Further, high-frequencies can be accentuated and the compressor can be switched into a mode to compensate for background noise. In some implementations, the DSP can be utilized for audio processing with respect to telephone communications, in addition to audio playback.

Additionally, the device 200 can include a media button 220, which can be used to access media functionality. In some implementations, the media button 220 can be a multi-function button. For instance, a single press of the media button 220 can toggle the display between a media playback interface and the phone interface. A media playback interface can include commands to actuate a customized playback queue, for example. Further, pressing and holding the media button 220 can cause an interface corresponding to the media service, e.g. a home menu, to be presented. The device 200 can be configured such that accessing the media button 220 causes the corresponding media functionality to be presented, regardless of the previous function being performed and location within the device's command hierarchy. In some implementations, the functionality corresponding to media button 220 also can be state dependent. For instance, when media is playing, pressing the media button 220 can cause the music player interface to be displayed, while pressing and holding can cause the home screen of the remote media catalog (or store) to be displayed. The device 200 also can include physical controls for other functions, including volume and traversing back in the interface.

Also, in some implementations, a back button 222 can be included on the device 200. For implementations in which a back button 222 is included, the corresponding functionality can be removed from one or more interfaces presented on the device 200. For instance, one or more interfaces, e.g. associated with a media application, can include a virtual (or "soft") command button or other such icon that can be selected to navigate backward within the interface hierarchy, such as to a preceding interface screen. When the back button 222 is included as a physical control on the device 200, it can be selected to perform the navigation function associated with the virtual command button, e.g. returning to a preceding interface screen, and the virtual command button can be removed to simplify the interface. In some other implementations, physical and virtual command buttons can be provided for one or more functions, including navigation.

Figure 3:
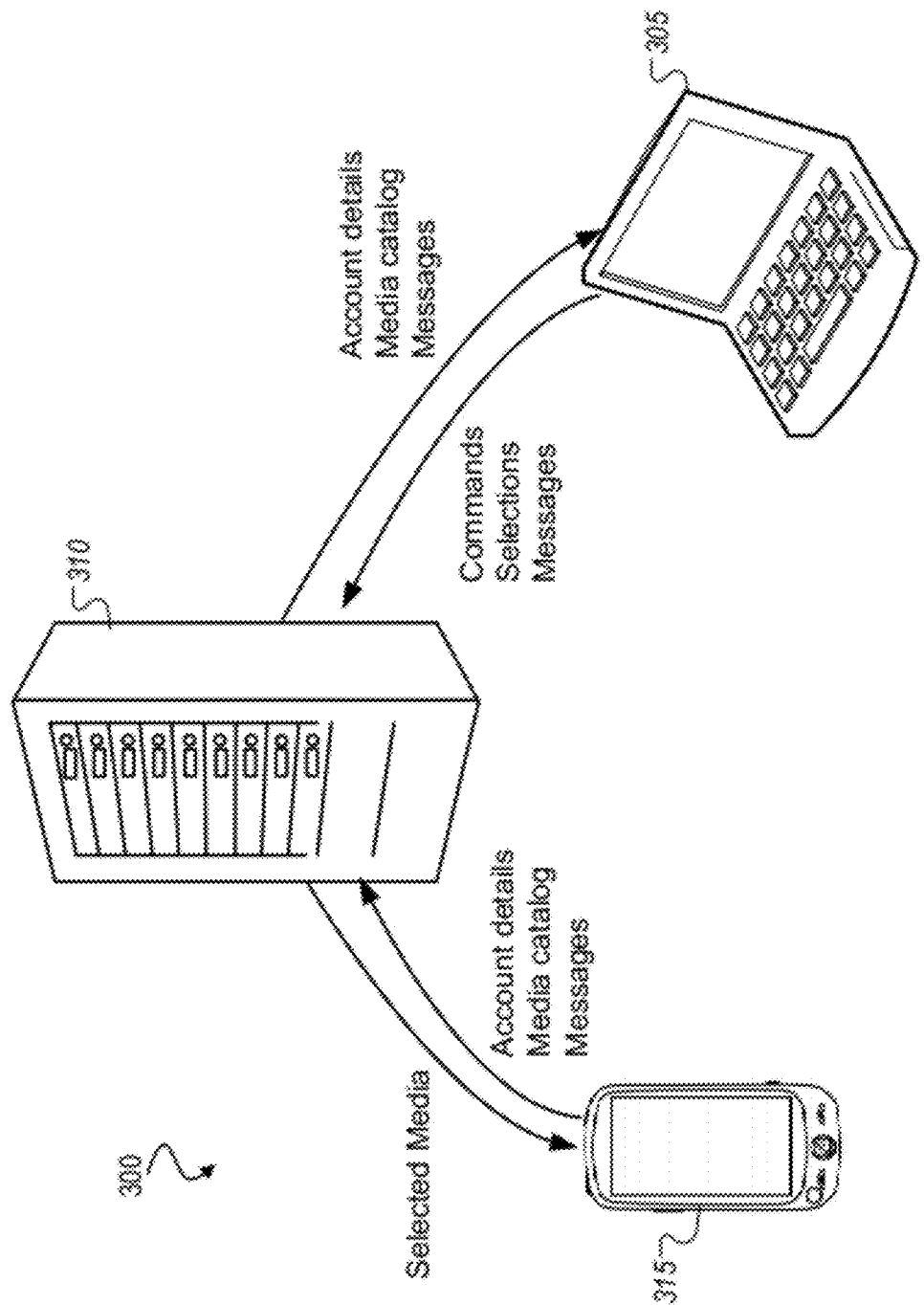
FIG. 3 shows an exemplary data flow between a mobile communications device, a computing device, and a server.

FIG. 3 shows an exemplary data flow between a mobile communications device, a computing device, and a server. Computing environment 300 can include a computing device 305, a server 310, and a mobile communications device 315. Computing device 305 can be implemented using any computer, including a desktop computer, a laptop computer, a net book, a tablet computer, a workstation, and a server. Further, server 310 can be implemented using one or more servers, e.g. as a combination of servers forming a virtual server, including one or more application servers, data servers, and web servers. Additionally, mobile communications device 315 can be any communication device configured to provide data communications, e.g. a smart phone or web-enabled phone.

Server 310 can communicate separately with both computing device 305 and mobile communications device 315. For instance, server 310 can communicate with computing device 305 over a public network, e.g. the internet, a private network, e.g. a local area network (LAN), or a combination thereof. Further, server 310 can communicate with mobile communications device 315 over a network that includes a wireless data network link, e.g. to a 3G or 4G network. Further, computing device 305 can communicate with mobile communications device 315 via a communications network, e.g., via a Wi-Fi or a 3G or 4G network. In some implementations, computing device 305 and mobile communications device 315 can be configured such that they do not communicate directly with each other.

Computing device 305 can communicate with server 310 to perform operations relating to one or more hosted media applications. For instance, computing device 305 can perform account management functions, messaging, and play list management. One or more items of media content associated with the managed play list can be selected for inclusion in a customized playback queue. Server 310 can provide one or more interfaces to computing device 305. In some implementations, the one or more interfaces can be formatted for a larger display and thus can include additional information than corresponding interfaces provided to mobile communications device 315. Further, one or more of the interfaces provided to computing device 305 can be unique, such that they are not available for presentation to mobile communications device 315. Additionally, the one or more interfaces can be presented without installing an application or plug-in, e.g. as web pages presented in a browser. The interfaces can be compatible with multiple browsers, such that subscriber management from the computing device 305 can be platform independent.

The interfaces provided by server 310 can enable access to account details relating to a subscribing user, e.g. address and subscription information. Further, server 310 can provide access to at least a portion of a media collection or a central media archive, including one or more remote play lists (e.g., play lists that are not created and managed on a subscriber's mobile communications device). Items of media content can be selected from the media collection or central media archive for download to a mobile communications device 315. The downloaded items of media content can be selected to be included in a customized playback queue. Also, play lists can be managed from the computing device 305, including generating play lists, modifying play lists, deleting play lists, subscribing to play lists and unsubscribing from play lists. Additionally, server 310 can provide access to one or more social services, including messaging associated with a media application. The social services can include the ability to read messages that have been received, the ability to generate new messages, and the ability to view and interact with one or more friends and neighbors. Through the social services functionality, one or more items of media content can be viewed and selected from one or more play lists associated with one or more friends and neighbors. The selected one or more items of media content can be included in a customized playback queue for playback on a communications device.

Server 310 further can be configured to transfer media content selected through computing device 305 directly to mobile communications device 315. For instance, a user can browse the media collection provided by server 310 through an interface provided by computing device 305, and can select one or more items of media content, e.g. songs, for download. The items of media content selected for download can be transferred, e.g. through an over-the-air download, directly to mobile communications device 315. Further, one or more media items associated with a play list that was subscribed to through computing device 305 can be transferred directly to mobile communications device 315. As a result, mobile communications device 315 need not be synchronized with, or otherwise communicate with, computing device 305. Also, media content need not be downloaded to or stored on computing device 305. Thus, shared computing devices, e.g. library or school computers, can be used to perform account management and media management functions. Any item of media content transferred to the mobile communications device 315 as described above can be selected to be included in a customized playback queue.

Additionally, an application can be downloaded to computing device 305 from server 310, which can be executed to identify media items stored on the computing device 305 that correspond to one or more identified media types. For instance, the application can be executed to scan one or more storage locations associated with computing device 305 and to identify files corresponding to one or more predetermined formats, such as MP3, WMA, M4A, AAC, or WAV. Further, metadata associated with media items identified at computing device 305 can be transferred back to the server 310. The transferred metadata can be analyzed by server 310 to determine whether it corresponds to one or more media items stored in the central media archive. In some implementations, any media items so identified from the central media archive can be automatically downloaded to the mobile communications device 315. In some other implementations, a list of media items included in the central media archive that match metadata transferred from the computing device 305 can be presented to a user, who can select any or all of the listed media items for transfer to the mobile communications device 315. Any item of media content transferred to the mobile communications device 315 as described above can be selected to be included in a customized playback queue.

Figure 4:
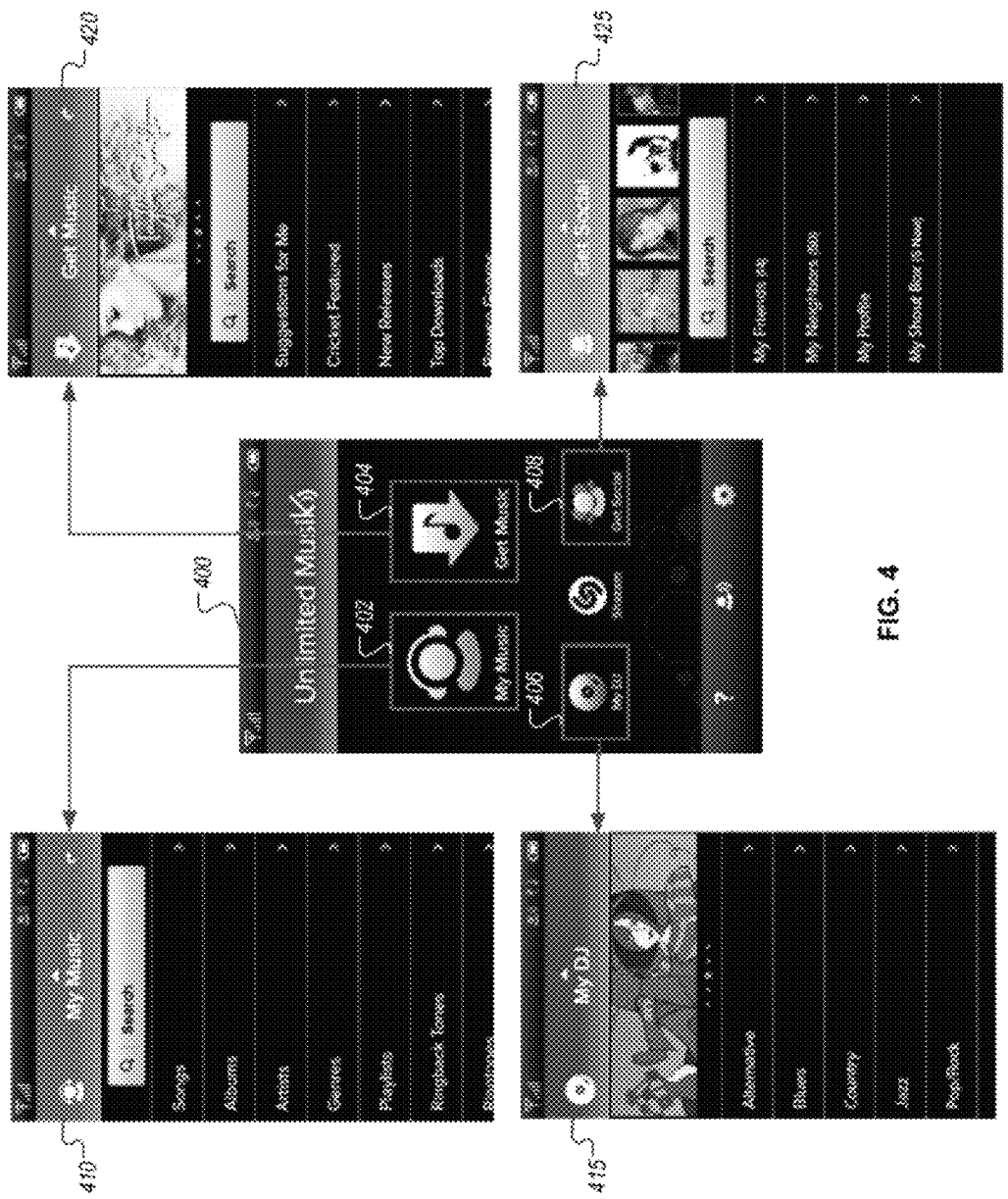
FIG. 4 shows exemplary media interfaces associated with a media application that can be presented by a mobile communications device.

Playback queue functionality can be invoked from any interface in which at least one item of media content is identified, e.g., by selecting a playback queue control, such as a songs command button, an icon or a menu item. FIG. 4 shows exemplary media interfaces associated with a media application that can be presented by a mobile communications device. A home media interface 400 can be presented, which can provide access to functional areas within the media application as well as access to one or more utilities. The home media interface 400 can be the top-level interface for the media application. Home media interface 400 can include selectable icons corresponding to functional areas, including MyMusic icon 402, GetMusic icon 404, MyDJ icon 406, and GetSocial icon 408. An icon can be selected (or actuated) through any known technique, including through touch and cursor designation. The icons presented are representative and other implementations can include fewer, more, and/or different icons.

MyMusic icon (or button) 402 can be selected to present a local media interface 410, which can provide access to and browsing of the local media archive stored on the mobile communications device. The local media interface 410 can include categories by which the locally stored media can be sorted, including local playlists. Thus, a subscriber can maintain the local playlist using the local media interface. One or more other categories also can be included, such as songs, albums, artists, genres, ringtones, ringback tones, music videos, television shows, and movies. Selecting any of the above categories, such as songs from the local media interface 410 can present another interface, hierarchically organized as a sub-interface, that shows media corresponding to that category, allowing a user to traverse the local media archive. The local media interface 410 also can include a search tool, which can be used to search the local media archive, e.g. using keyword searching. Any item of media content in the local media archive can be selected by the user for inclusion in a customized playback queue. An example of creating and/or maintaining a customized playback queue through the selection of song category is described with respect to FIGS. 5-6 below.

GetMusic icon 404 can be selected to present a remote media interface 420, corresponding to a remote music archive or media store. The remote media interface 420 can provide access to and browsing of the remote media archive and can be configured to include categories by which the media is organized. For instance, the remote media interface 420 can include one or more categories corresponding to the local media interface 410 including playlists, songs, albums, artists, genres, ringtones, and ringback. The remote media interface 420 also can include one or more other categories, including personalized suggestions, featured media, new releases, and top downloads, e.g. for a predetermined period of time, such as a day, week, or month. Selecting a category from the remote media interface 420 can present another interface, hierarchically organized as a sub-interface, that shows media corresponding to the selected category, allowing a using to traverse the remote media archive. The remote media interface 420 also can include a search tool, which can be used to search the remote media archive, e.g. using keyword searching. Any item of media content in the remote media archive accessed through the GetMusic icon 404 can be selected by the user for inclusion in a customized playback queue. In some implementations, download of a remote item of media content can begin automatically upon its selection for inclusion in the customized playback queue. Further, the item of media content may be made accessible to the customized playback queue as soon as the download completes.

MyDJ icon 406 can be selected to present a media access interface 415, which can provide access to and browsing of the items of media content associated with a local media archive and a remote media archive available to the mobile communications device. The local and remote media archives can be organized as playlists, which can include either or both of local playlists, e.g. generated by the user of the device, and remote playlists that are generated by an external provider, such as another user or the system operator. A subscriber can expose their local playlists so that other music system subscribers can subscribe to them. Any subsequent changes to such a local playlist can cause the local media archives of any subscribers to be modified in kind. The media access interface 415 can include categories by which the items of media content including the playlists can be sorted, such as genre, content, and playlist source. For instance, the items of media content including the playlists can be organized using genres such as alternative, blues, country, jazz, and pop/rock. Selecting a category from the media access interface 415 can present another interface, hierarchically organized as a sub-interface, that shows items of media content including playlists corresponding to that category. In some implementations, the items of media content shown can include items of media content that are presently available, e.g. those associated with local playlists and subscribed playlists, and playlists that are not presently available but can be subscribed to. Further, the playlists that are presently available can be visually distinguished from those that are not, such as through highlighting or through the association of a graphical identifier. Any item of media content in the local or remote media archive accessed through the playlist interface 415 can be selected by the user for inclusion in a customized playback queue. In some implementations, download of a remote item of media content can begin automatically upon its selection for inclusion in the customized playback queue. Further, the item of media content may be made accessible to the customized playback queue as soon as the download completes.

GetSocial icon 408 can be selected to present a social interface 425, which can provide access to the subscriber's community. The community can include connected friends who also are subscribers to the media service, identified neighbors, and a Shout box that provides access to messaging within the media application and service. Further, the social interface 425 can provide access to the subscriber's profile, which can be used to describe and publicize subscriber characteristics, including musical preferences and the subscriber's local media archive. The social interface 425 also can include a search tool, which can be used to search the subscriber's social connections, e.g. using keyword searching. The social interface can be used to access and select one or more items of media content to be included in a customized playback queue.

Figure 5:
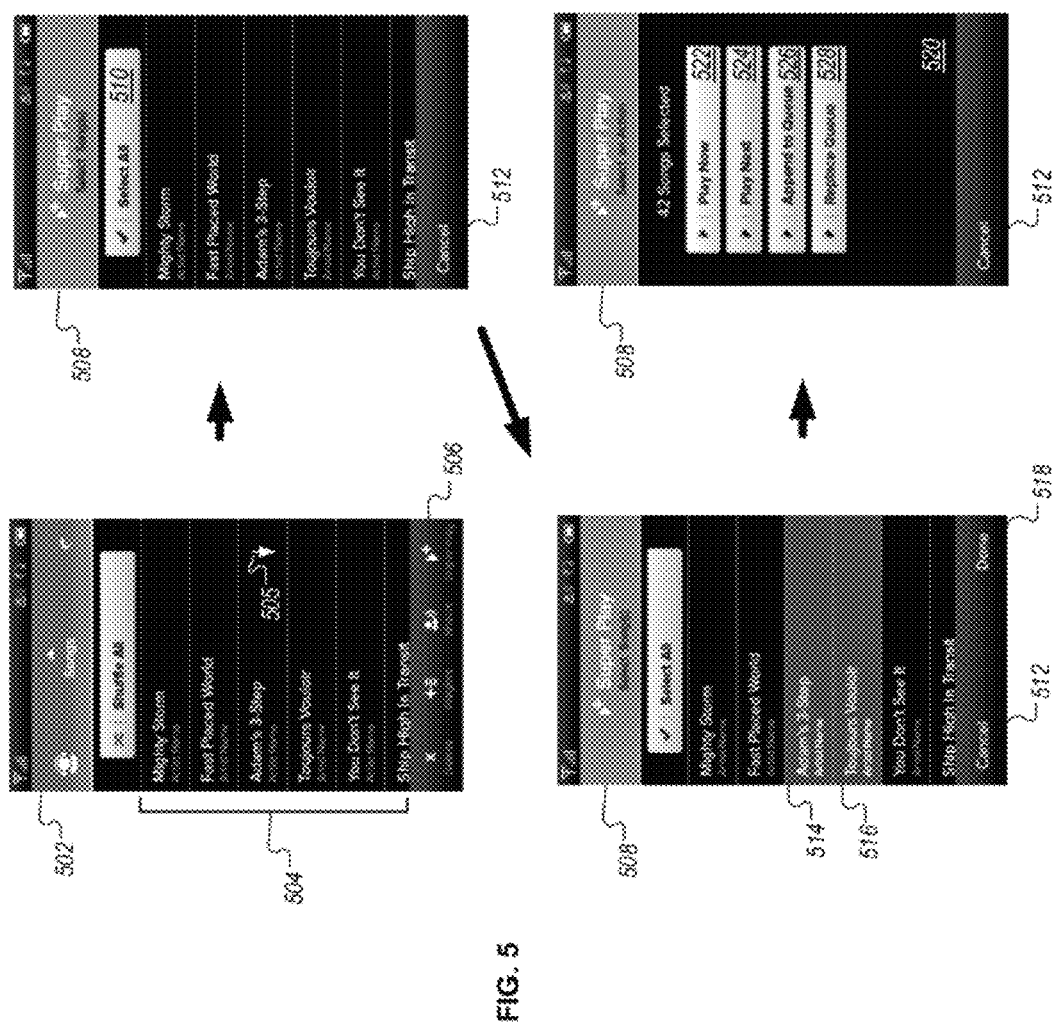
FIG. 5 shows exemplary interfaces associated with playback queue management that can be presented by a mobile communications device.

FIG. 5 shows exemplary interfaces associated with playback queue management that can be presented by a mobile communications device. The media application can maintain a playback queue for media playback by the mobile communications device. At any time, the playback queue can include zero or more items of media, e.g. songs. Further, the media application's playback queue can be managed from one or more of the functional areas of the media application, such as the MyMusic, GetMusic, MyDJ, and GetSocial functional areas as shown in FIG. 4 above. Playback queue management can be accessed at any time by selecting a playback queue (or "SuperPlay") control, such as an icon or command button presented in an interface.

For instance, a songs interface 502 corresponding to an album for which one or more tracks are stored in the local media archive can be presented. The songs interface 502 can identify the name of the album, e.g. Fast Paced World, and can include a track listing 504 identifying all of the tracks included on that album or only the tracks included in the local media archive. The track listing 504 can be scrollable and/or resizable if the number of tracks exceeds the amount of available display space in the interface. If the names of all tracks are displayed, the names of tracks that are stored in the local music archive, e.g. in MyMusic, can be visually distinguished from the names of the remaining tracks, such as through highlighting, text color, shading, or the presentation of a graphical device. Further, a download indicator 505 can be presented in association with a track in the track listing 504 that is in the process of being downloaded. Additionally, the songs interface 502 can feature one or more user selectable command buttons, e.g. at the bottom of the interface, including a SuperPlay button 506.

When SuperPlay is invoked, e.g., by actuating the SuperPlay button 506, the media items displayed in the preceding interface (the interface from which SuperPlay was invoked) are still presented and remain selectable. However, the media items are selectable for use in management of the play queue, which can include zero, one, or multiple media items at any given time. Any number of media items can be selected and a selected media item also can be deselected, e.g., through being selected again. For instance, an individual item of media content can be selected through direct touch input or all items of media content included in an interface can be selected through actuation of a "select all" button.

The SuperPlay button 506 can be selected to manage the playback queue of the media application. If no songs are playing and no songs have been selected for playback, the playback queue is empty. Otherwise, at least one song is included in the playback queue. Selecting the SuperPlay button 506 can cause a SuperPlay interface 508 (or playback queue management interface) to be displayed. The SuperPlay interface 508 can show the same items of media content as the interface from which the SuperPlay button 506 was selected, e.g. the songs interface 502 corresponding to an album, e.g. Fast Paced World. The SuperPlay interface 508 can be configured to permit one or more tracks from the track listing 504 to be selected. For instance, a select all button 510 can be actuated to select all of the tracks. Also, one or more tracks can be selected or deselected individually, by actuating the corresponding entry in the track listing 504. If a track has not been selected, actuating the corresponding track listing, e.g. in a touch-interface, causes the track to be selected. Conversely, if a track has been selected, actuating the corresponding track listing causes the track to be deselected. A cancel button 512 also can be presented in the SuperPlay interface 508. Selecting the cancel button 512 can cause the media application to exit the SuperPlay function without amending the playback queue, and any selections that had been made can be discarded.

A track that has been selected can be visually identified in the track listing 504, e.g. by highlighting the track entry or by altering either or both of the text color and the background color. For instance, the selected tracks Adam's 3—Step 514 and Toujours Vouloir 516 can be presented using a different background color to distinguish them from the remaining tracks that have not been selected. Additionally, a "done" button 518 can be presented in the SuperPlay interface 508, e.g. upon selection of the first track, to indicate that track selection is complete.

In response to selection of the done button 518, a SuperPlay summary or menu 520 can be presented in the SuperPlay interface 508 to indicate the state of the playback queue and to provide for playback queue management. For instance, the SuperPlay summary 520 can indicate how many selected tracks are presently included in the playback queue, e.g. 42 songs. Further, the SuperPlay summary 520 can include one or more command buttons, such as the PlayNow button 522, PlayNext button 524, AppendtoQueue button 526, and ReplaceQueue button 528. Selecting the PlayNow button 522 causes playback of the first of the newly selected tracks to begin immediately. Selecting the PlayNext button 524 causes playback of the first of the newly selected tracks to begin after the presently playing song ends. If either of the play now and play next commands is selected, the newly selected media items can be placed at the front of the playback queue, while maintaining all of the media content already in the playback queue. Selecting the AppendtoQueue button 526 causes the one or more selected tracks to be added to the end of the existing playback queue. Also, selecting the ReplaceQueue button 528 causes the tracks previously in the playback queue to be discarded and the playback queue to be populated only with the newly selected tracks.

Figure 6:
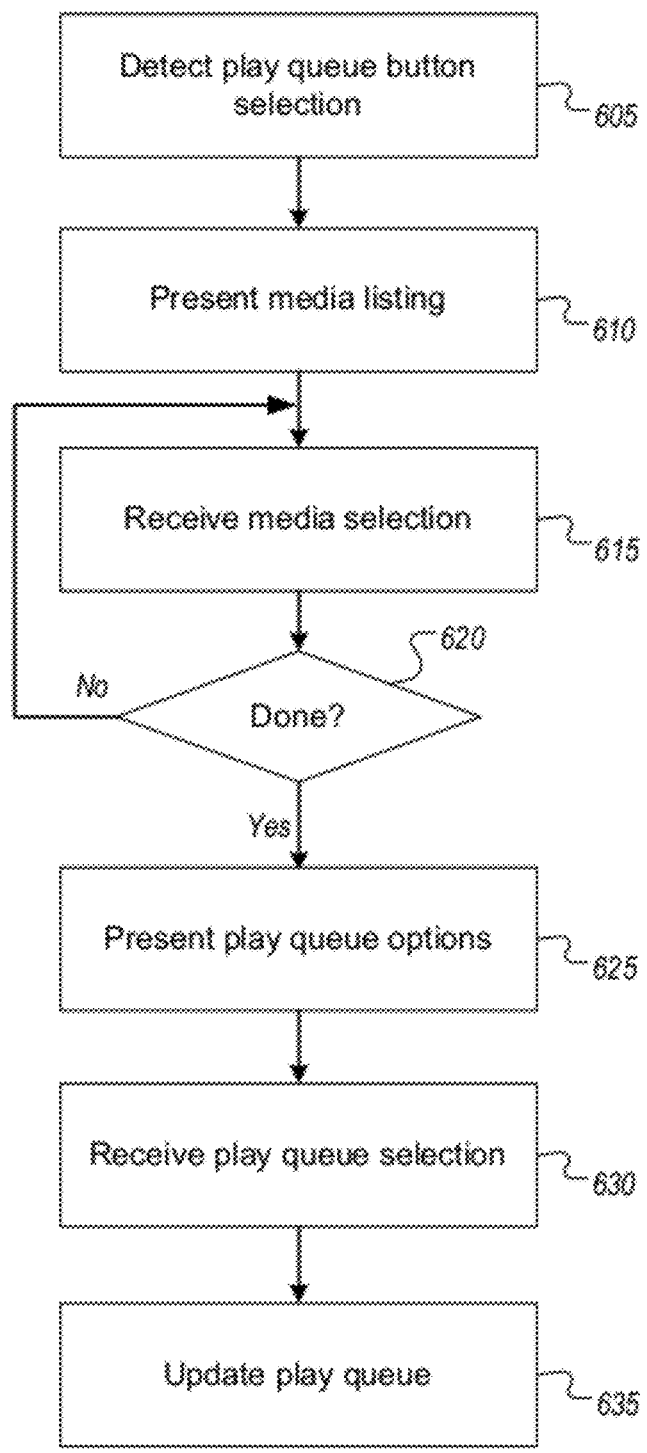
FIG. 6 shows an exemplary process flow for playback queue management.

FIG. 6 shows an exemplary process flow for playback queue management. The media application can maintain a playback queue that includes zero or more songs that are ordered for playback. Further, the playback queue can be updated (or modified) at any time, including during playback of an item of media content. Updating of the playback queue can be initiated in response to detecting the selection of a playback queue (or SuperPlay) button or other such control (605). A playback queue button can be included in various interfaces of the media application, such as interfaces that identify one or more items of media content. Alternatively or additionally, a playback queue button can be implemented outside of the application interfaces, such as by using a physical control on the device or a virtual control implemented in a persistently displayed menu.

A media listing can be generated and presented in response to the selection of the playback queue button (610). The media listing can include one or more items of media content shown in, or otherwise associated with, the interface from which the playback queue button was selected. Further, the media listing can include zero, one, or more additional items of media content. The selection of an item of media content from the media listing can be received (615) and it can be determined whether any more selections are to be made (620). For instance, it can be determined whether input indicating an end of the media selection, e.g. a done command, has been received. If media selection is on-going, an additional media selection can be received (615).

Otherwise, one or more playback queue options can be presented (625). For instance, the playback queue options can include an option to begin playback of the one or more selected items of media content immediately. Beginning playback of the one or more selected items can cause playback of one or more presently playing media items to be canceled or suspended. The playback queue options also can include an option to play the one or more selected items of media content after playback of the presently playing media item has completed. Further, the playback queue options can include an option to append the one or more selected items of media content to the existing playback queue and an option to discard the existing playback queue and generate a new play queue based on the selected items of media content. The selection of one of the presented playback queue options can be received (630) and the playback queue can be updated accordingly (635).

Through SuperPlay, the playback queue can be continuously managed from any interface that identifies one or more items of content, including the MyMusic, GetMusic, MyDJ, and GetSocial functional areas. For instance, one or more tracks from an album interface can be added to the play queue through SuperPlay. Selecting one or more tracks from the album interface can be implemented in a manner similar to the selection of media items from another interface, such as the songs interface. Likewise, one or more items of media content can be selected for inclusion in a customized playback queue from other interfaces or collections, including interfaces showing playlists, artists, genres, ringtones, and ringback. Additionally, a social interaction interface, e.g. showing a neighbor's playlist or other such collection of media items, can be accessed and, using SuperPlay, one or more items of media content included in the social interaction interface can be added to the subscriber's play queue as described below.

FIGS. 7A and B show exemplary play queues and play queue modification in the media application. The play queue can include zero or more media items when SuperPlay functionality is invoked. In the present examples, the media items can be songs (or tracks). In other implementations, any other media items or combination of media items can be used, including video. As shown in FIG. 7A, current play queue 702 can include four songs, Song 1 704, Song 2 706, Song 3 708, and Song 4 710. Further, Song 1 704 can be in the process of being played back.

SuperPlay can be invoked and one or more songs, e.g. the song Mighty Storm 712, can be selected. When the song selection is complete, one or more play queue management options can be presented for selection, such as play now, play next, append to queue, and replace queue. In some implementations, additional, fewer, and/or different play queue management options can be presented.

In response to selection of the play now option 714, a modified play queue 716 can be generated. The one or more selected songs, e.g. Mighty Storm 712, can be inserted at the front of the play queue. If only one song, Mighty Storm 712, is selected through the SuperPlay function, playback of that song also can be initiated. If multiple songs are selected through SuperPlay, playback of one of the newly selected songs can be initiated and the remaining newly selected songs can be inserted, after that song, at the front of the play queue. The newly selected songs can be arranged in any order, including the order of selection and the order of presentation in the interface from which they were selected.

In response to selection of the play next option 718, a modified play queue 720 can be generated by inserting the one or more selected songs, e.g. Mighty Storm 712, after the currently playing song, e.g. Song 1 704. If multiple songs are selected through SuperPlay, the selected songs can be arranged in the modified play queue 720 in any order after the currently playing song, but before any remaining songs in the play queue. As a result, playback of the one or more selected songs will begin after playback of the currently playing song terminates.

Figure 7B:
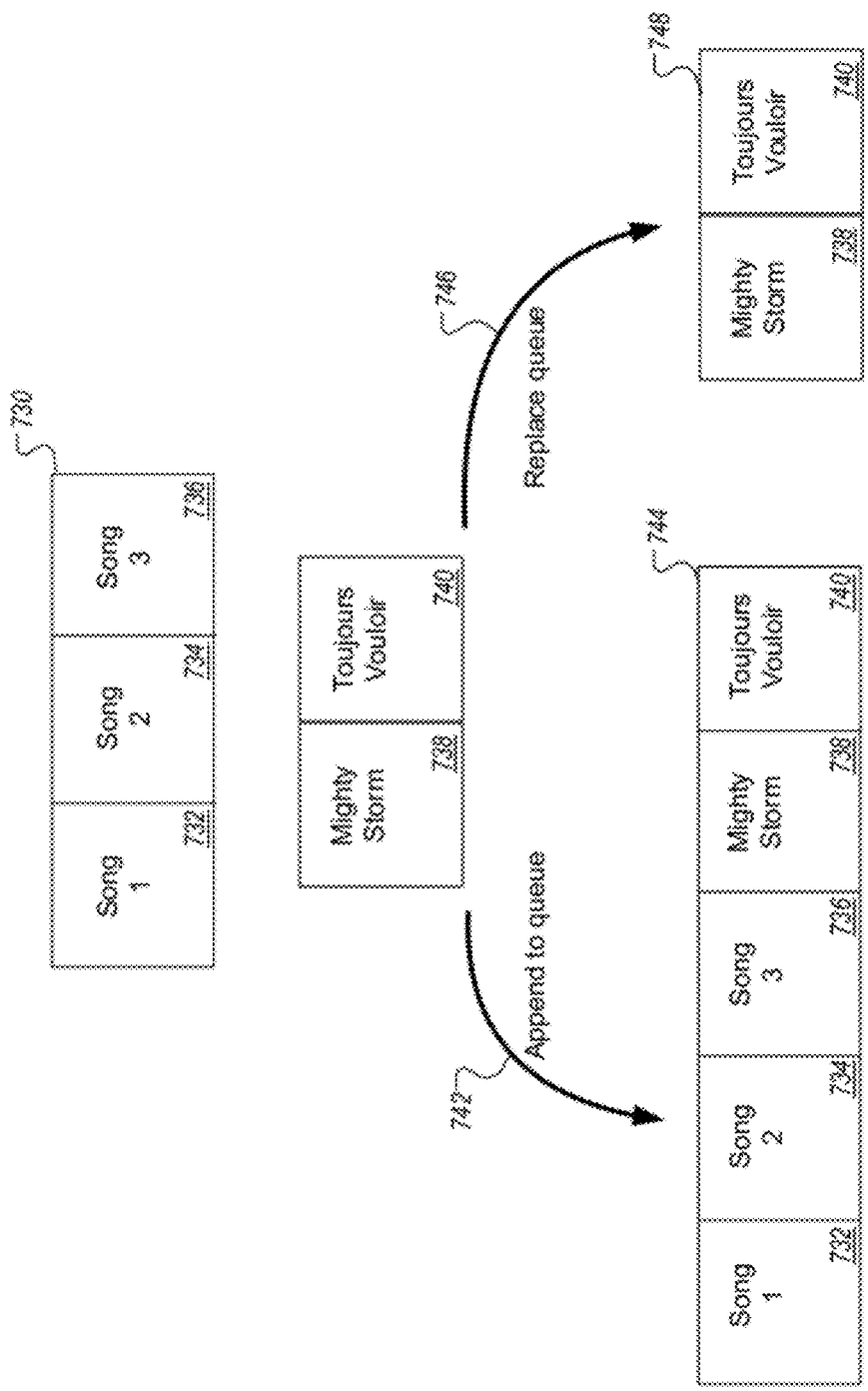
FIGS. 7A and B show exemplary play queues and play queue modification in the media application.

Another example play queue 730 is shown in FIG. 7B. The play queue 730 can include three songs, Song 1 732, Song 2 734, and Song 3 736. Further, Song 1 732 can be in the process of being played back. SuperPlay can be invoked and one or more songs, e.g. the song Mighty Storm 738 and the song Toujours Vouloir 740, can be selected. When the song selection is complete, one or more play queue management options can be presented for selection, such as play now, play next, append to queue, and replace queue. In some implementations, additional, fewer, and/or different play queue management options can be presented.

In response to selection of the append to queue option 742, a modified play queue 744 can be generated. The one or more selected songs, e.g. Mighty Storm 738 and Toujours Vouloir 740, can be inserted at the end of the play queue, after all previously inserted songs. If multiple songs are selected through SuperPlay, the selected songs can be arranged at the end of the modified play queue 744 in any order.

In response to selection of the replace queue option 746, a modified play queue 748 can be generated by discarding all of the songs from the play queue 730 and inserting the selected songs, e.g. Mighty Storm 738 and Toujours Vouloir 740, into the play queue. The selected songs can be inserted into the modified play queue 748 in any order. Further, playback of one of the selected songs can be initiated.

The SuperPlay functionality described above can be implemented to manage (e.g., create, append, replace, etc.) a play queue by adding songs, albums, genres and playlists from the subscriber's MyMusic library. When SuperPlaying songs, albums, genres, artists and playlists, media content items from the following can be included into the play queue: 1) individual songs from any where in the MyMusic library; 2) entire album(s); 3) one or more songs and/or entire album from a genre; 4) one or more songs from an artists; and 5) one or more songs or entire playlist can be mix-and-matched to be combined into the play queue using the play now, play next, append to queue and replay queue features described above. A playlist can include a stored grouping of songs, albums, artists, etc. made by the subscriber or groupings of songs created by the system and subscribed to by the subscriber. Accordingly, SuperPlay can be applied to individual media content items and also to navigational hierarchies of media content items, independent of how they are organized or grouped (e.g., by artists, album, genre, playlist, etc.)

Also, additional features can be implemented. For example, a single actuation (e.g., tap or click) can play all media content items in view. Actuating in the middle of the song list can initiate playback of all media content items from the point of actuation. In addition, the subscriber can have an option to make SuperPlay function as a default when interfacing with media content items. For example, a subscriber actuation of a song can default to SuperPlay action. This can help prevent unwanted changes to the playlist when the user meant to SuperPlay to change the play queue rather than make changes to a play list or the contents of the MyMusic library. Similarly, the system can help to prevent unwanted changes to the play queue when the subscriber meant to create a playlist instead. For example, a warning message could be displayed to the user that the play queue will be wiped out and ask whether the subscriber wishes to SuperPlay or make a playlist.

When SuperPlaying on songs, albums, artists, genres and playlists, the media content items SuperPlayed are added to the play queue (whether appended or replaced the play queue) in alphabetical order as a default. However, in some implementations, the media content items can be added to the play queue in the order selected by the subscriber. Also, the order of the media content item in the play queue can be rearranged by using 'drag-and-drop' actions or actuating the 'shuffle all' button. Any songs, albums, artists added to the play queue can be removed by selecting the media content item and actuating the remove button.

Figure 8:
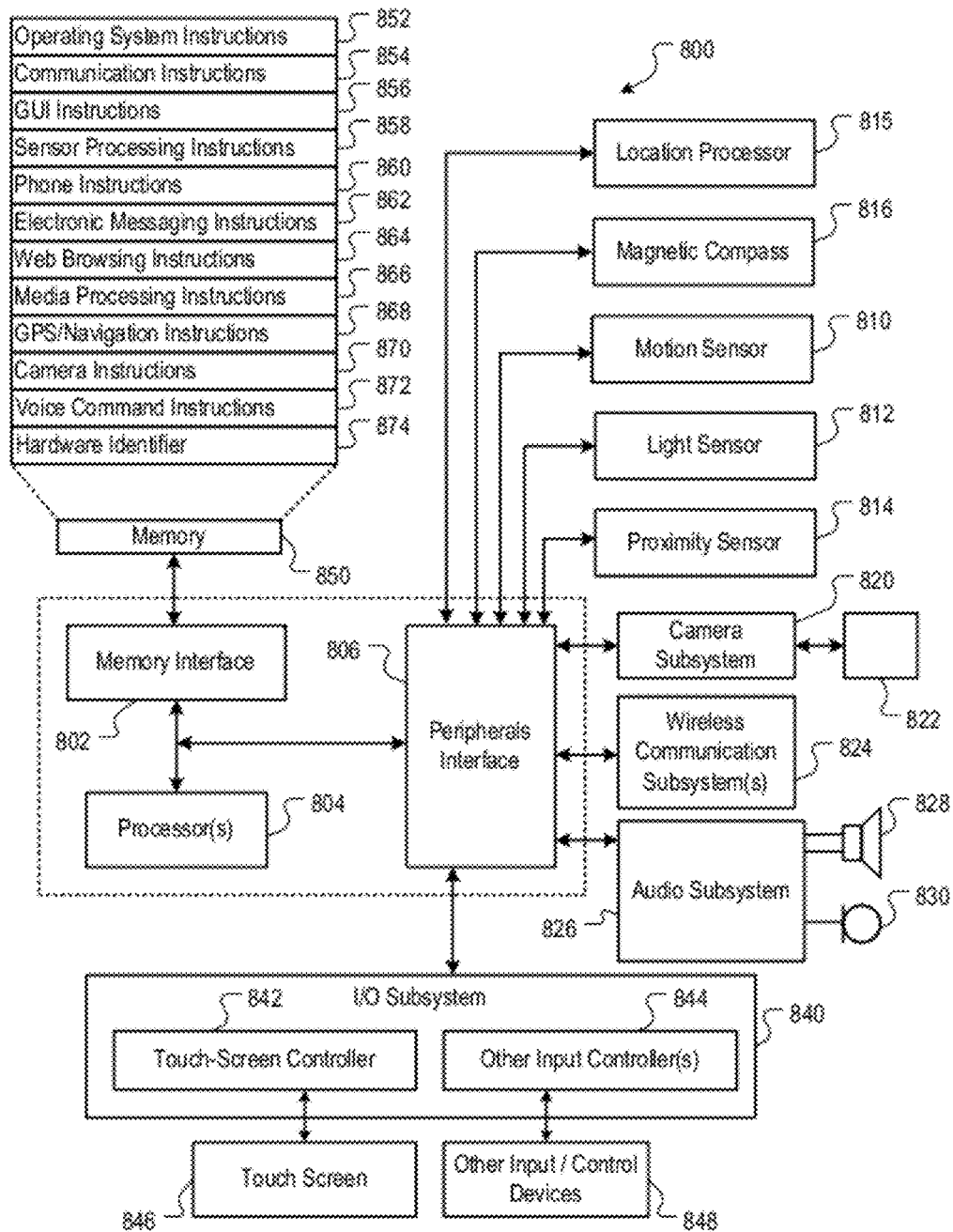
FIG. 8 is a block diagram of an exemplary architecture of a data processing device, such as a communications device.

FIG. 8 is a block diagram of an exemplary architecture 800 of a data processing device, such as the communications device 115, 125 and 315. The data communications devices 115, 125 and 315 can include a memory interface 802, one or more data processors, image processors and/or central processing units 804, and a peripherals interface 806. The memory interface 802, the one or more processors 804 and/or the peripherals interface 806 can be separate components or can be integrated in one or more integrated circuits. Various components in the data communications devices 115, 125 and 315 can be coupled together by one or more communication buses or signal lines.

Sensors, devices, and subsystems can be coupled to the peripherals interface 806 to facilitate multiple functionalities. For example, a motion sensor 810, a light sensor 812, and a proximity sensor 814 can be coupled to the peripherals interface 806 to facilitate the orientation, lighting, and proximity functions. A location processor 815 (e.g., GPS receiver) can be connected to the peripherals interface 806 to provide geopositioning. A magnetic compass integrated circuit 816 can also be connected to the peripherals interface 806 to provide orientation (e.g., to determine the direction of due North).

A camera subsystem 820 and an optical sensor 822, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 824, which can include radio frequency receivers and transmitters and/or optical (e.g., infrared) receivers and transmitters. The specific design and implementation of the communication subsystem 824 can depend on the communication network(s) over which the data processing devices is intended to operate. For example, communications devices 115, 125 and 315 may include communication subsystems 824 designed to operate over a GSM network, a GPRS network, an EDGE network, a Wi-Fi or WiMax network, and a Bluetooth™ network. In particular, the wireless communication subsystems 824 may include hosting protocols such that the communications devices 115, 125 and 315 may be configured as a base station for other wireless devices.

An audio subsystem 826 can be coupled to a speaker 828 and a microphone 830 to facilitate voice-enabled functions, such as voice recognition, voice replication, digital recording, and telephony functions.

The I/O subsystem 840 can include a touch screen controller 842 and/or other input controller(s) 844 to control the inputs and outputs of the communications devices 115, 125 and 315. For example, the I/O subsystem 840 can include a microphone (internal and/or external), a speaker and a voice command recognition engine. The I/O subsystem 840 can receive voice commands and present audio outputs over full duplex communication. For example, transport technologies other than regular cellular voice communications, such as voice over IP, can be implemented.

Also, voice commands can be processed using a two-pass process. The on-device voice command module can process the received voice commands to perform a generalized recognition. Audio data of the received voice commands can be sent to a server to provide a more detailed and accurate processing. The server may be better equipped (e.g., using a faster and more powerful processor) to perform voice command recognition than a mobile device. To reduce bandwidth requirements and latency issues, the audio data may not be sent to the server in its entirety. For example, the on-device voice command module can process the voice commands to identify strings of numbers, but may not be able to identify the exact voice commands. Thus, the on-device voice command module may determine that the voice commands or utterance contain "some numbers." A larger surrounding segment of the audio data can be sent to the server, and the server can asynchronously return a much better idea of what was actually said in the voice commands. By using the server in such manner, the benefits of server processing can be obtained while reducing or minimizing the costs involved with the server processing.

The touch-screen controller 842 can be coupled to a touch screen 846. The touch screen 846 and touch screen controller 842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 846.

The other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of the speaker 828 and/or the microphone 830.

In one implementation, a pressing of the button for a first duration may disengage a lock of the touch screen 846; and a pressing of the button for a second duration that is longer than the first duration may turn power to the communications devices 115, 125 and 315 on or off. The user may be able to customize a functionality of one or more of the buttons. The touch screen 846 can, for example, also be used to implement virtual or soft buttons and/or a keyboard.

In some implementations, the communications devices 115, 125 and 315 can present recorded audio and/or video files, such as MP3, AAC, and MPEG files. In some implementations, the communications devices 115, 125 and 315 can include the functionality of an MP3 player.

The memory interface 802 can be coupled to memory 850. The memory 850 can include high-speed random access memory and/or non-volatile memory, such as one or more magnetic disk storage devices, one or more optical storage devices, and/or flash memory (e.g., NAND, NOR). The memory 850 can store an operating system 852, such as Darwin, RTXC, LINUX, UNIX, OS X, WINDOWS, or an embedded operating system such as VxWorks. The operating system 852 may include instructions for handling basic system services and for performing hardware dependent tasks. In some implementations, the operating system 852 can be a kernel (e.g., UNIX kernel).

The memory 850 may also store communication instructions 854 to facilitate communicating with one or more additional devices, one or more computers and/or one or more servers. The memory 850 may include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GPS/Navigation instructions 868 to facilitate GPS and navigation-related processes and instructions; camera instructions 870 to facilitate camera-related processes and functions; and voice command instructions 872 to facilitate operation of the communications devices 115, 125 and 315 as described in reference to FIGS. 1-7B above. In some implementations, the GUI instructions 856 and/or the media processing instructions 866 implement the features and operations described in reference to FIGS. 1-7B.

The memory 850 may also store other software instructions (not shown), such as web video instructions to facilitate web video-related processes and functions; and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively. An activation record and International Mobile Equipment Identity (IMEI) 874 or similar hardware identifier can also be stored in memory 850.

Each of the above identified instructions and applications can correspond to a set of instructions for performing one or more functions described above. These instructions need not be implemented as separate software programs, procedures, or modules. The memory 850 can include additional instructions or fewer instructions. Furthermore, various functions of the data processing devices may be implemented in hardware and/or in software, including in one or more signal processing and/or application specific integrated circuits.

Figure 9:
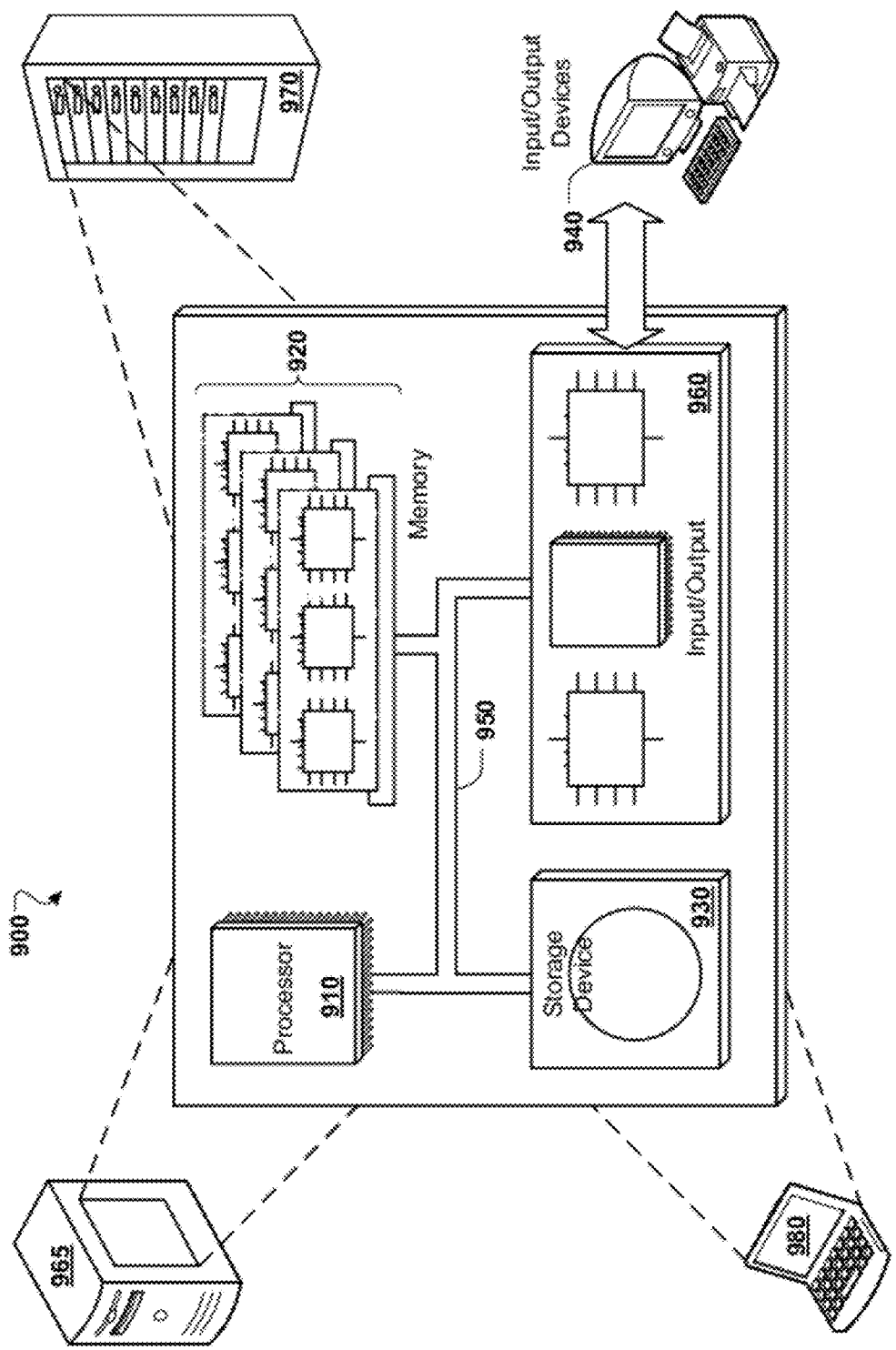
FIG. 9 is a block diagram of another computing device and system, such as servers and computing systems that can be used, e.g., to provide subscribers with unlimited access to media content.

FIG. 9 is a block diagram of another computing device and system, such as the servers 105, 310 and the computing system 120 that can be used, e.g., to provide subscribers with unlimited access to media content as described with respect to FIGS. 1-7B. Computing device 900 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations described and/or claimed in this document.

Computing device 900 includes a processor 910, memory 920, a storage device 930, a high-speed interface 950 connecting to memory 920. The computing device can also include high-speed expansion ports (not shown), and a low speed interface (not shown) connecting to low speed bus (not shown) and storage device 930. Each of the components 910, 920, 930, 950, and 920, are interconnected using various busses, and can be mounted on a common motherboard or in other manners as appropriate. The processor 910 can process instructions for execution within the computing device 900, including instructions stored in the memory 920 or on the storage device 930 to display graphical information for a GUI on an external input/output device, such as display 940 coupled to an input/output interface 960. In other implementations, multiple processors and/or multiple buses can be used, as appropriate, along with multiple memories and types of memory. Also, multiple computing devices 900 can be connected, with each device providing portions of the necessary operations (e.g., as a server bank, a group of blade servers, or a multi-processor system).

The memory 920 stores information within the computing device 900. In one implementation, the memory 920 is a computer-readable medium. In one implementation, the memory 920 is a volatile memory unit or units. In another implementation, the memory 920 is a non-volatile memory unit or units.

The storage device 930 is capable of providing mass storage for the computing device 900. In one implementation, the storage device 930 is a computer-readable medium. In various different implementations, the storage device 930 can be a floppy disk device, a hard disk device, an optical disk device, or a tape device, a flash memory or other similar solid state memory device, or an array of devices, including devices in a storage area network or other configurations. The computer program product contains instructions that, when executed, perform one or more methods, such as those described above. The computer- or machine-readable medium can include the memory 920, the storage device 930, memory on processor 910, or a propagated signal.

The high speed controller 950 manages bandwidth-intensive operations for the computing device 900, while the low speed controller manages lower bandwidth-intensive operations. Such allocation of duties is exemplary only. In one implementation, the high-speed controller 950 is coupled to memory 920, display 940 (e.g., through a graphics processor or accelerator), and to high-speed expansion ports (not shown), which can accept various expansion cards (not shown). In the implementation, low-speed controller (not shown) is coupled to storage device 930 and low-speed expansion port (not shown). The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 900 can be implemented in a number of different forms, as shown in the figure. For example, it can be implemented as a standard server 965, or multiple times in a group of such servers. It can also be implemented as a part of a rack server system 970. In addition, it can be implemented in a personal computer such as a laptop computer 980.

Moreover, the disclosed techniques for providing subscribers with unlimited access to media content may be implemented using one or more computer programs comprising computer executable code stored on a tangible computer readable medium and executing on the data processing device or system. The computer readable medium may include a hard disk drive, a flash memory device, a random access memory device such as DRAM and SDRAM, removable storage medium such as CD-ROM and DVD-ROM, a tape, a floppy disk, a Compact Flash memory card, a secure digital (SD) memory card, or some other storage device. In some implementations, the computer executable code may include multiple portions or modules, with each portion designed to perform a specific function described in one or more figures. In some implementations, the techniques may be implemented using hardware such as a microprocessor, a microcontroller, an embedded microcontroller with internal memory, or an erasable, programmable read only memory (EPROM) encoding computer executable instructions for performing the disclosed techniques. In other implementations, the techniques may be implemented using a combination of software and hardware.

Processors suitable for the execution of a computer program include, by way of example, both general and special purpose microprocessors, and any one or more processors of any kind of digital computer, including graphics processors, such as a GPU. Generally, the processor will receive instructions and data from a read only memory, a random access memory, or both. The elements of a computer include a processor for executing instructions and one or more memory devices for storing instructions and data. Generally, a computer will also include, or be operatively coupled to receive data from or transfer data to, or both, one or more mass storage devices for storing data, e.g., magnetic disks, magneto-optical disks, and optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto-optical disks; and CD ROM and DVD-ROM disks. The processor and the memory can be supplemented by, or incorporated in, special purpose logic circuitry.

To provide for interaction with a user, the systems, apparatus, and techniques described here can be implemented on a data processing device having a display device (e.g., an LED (light emitting diode) or LCD (liquid crystal display) monitor) for displaying information to the user and a positional input device, such as a keyboard and a pointing device (e.g., a touch screen, mouse, or trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the embodiments described above should not be understood as requiring such separation in all embodiments.

Only a few implementations and examples are described and other implementations, enhancements and variations can be made based on what is described and illustrated in this application.

What is claimed is as described and shown in this application:

1. A method comprising:
   receiving, by a server comprising a processor from a mobile communications device associated with a user, a first request to browse a media archive comprising one or more categories of media content;
   receiving, at the server from the mobile communications device, a first user selection of a category from the one or more categories of media content;
   receiving, at the server from the mobile communications device, a second request to initiate management of a playback queue, the playback queue comprising an item of media content positioned at the front of the playback queue;
   generating by the server responsive to the second request to initiate management of the playback queue, a media listing corresponding to available media content associated with the category;
   receiving, at the server from the mobile communications device, a second user selection of one or more items of the available media content associated with the category from the media listing, wherein the second user selection is indicative of a third request to add the one or more items of the available media content associated with the category to the playback queue;
   presenting, by the server to the mobile communications device, one or more playback queue options for the one or more items of the available media content corresponding to the second user selection, wherein the one or more playback queue options comprise a first playback queue option to insert, in the playback queue, the one or more items of the available media content corresponding to the second user selection before the item of media content positioned at the front of the playback queue;
   receiving, at the server from the mobile communications device, a third user selection of the first playback queue option of the one or more playback queue options; and
   in response to receiving the third user selection of the first playback queue option,
      generating, by the server, an updated playback queue comprising the one or more items of the available media content corresponding to the second user selection inserted before the item of the media content previously positioned at the front of the playback queue, and
      suspending, by the server, play of the item of the media content previously positioned at the front of the playback queue for play of the one or more items of the available media content corresponding to the second user selection.

2. The method of claim 1, further comprising:
   determining whether the second user selection of the one or more items of the available media content associated with the category from the media listing has ended; and
   in response to determining that the second user selection of the one or more items of the available media content associated with the category from the media listing has ended, presenting the one or more playback queue options for the one or more items of the available media content corresponding to the second user selection.

3. The method of claim 2, wherein determining whether the second user selection of the one or more items of the available media content associated with the category from the media listing has ended comprises receiving a user input indicating the second user selection of the one or more items of the available media content associated with the category from the media listing has ended.

4. The method of claim 1, wherein the one or more playback queue options for the one or more items of the available media content corresponding to the second user selection further comprises a second playback queue option to insert, in the playback queue, the one or more items of the available media content corresponding to the second user selection after the item of media content positioned at the front of the playback queue, wherein selection of the second playback queue option causes the one or more items of the available media content corresponding to the second user selection to play after play of the item of media content positioned at the front of the playback queue is complete.

5. The method of claim 1, wherein the one or more playback queue options for the one or more items of the available media content corresponding to the second user selection further comprises a second playback queue option to append the one or more items of the available media content corresponding to the second user selection to an end of the playback queue.

6. The method of claim 1, wherein the one or more playback queue options for the one or more items of the available media content corresponding to the second user selection further comprises a second playback queue option to discard the playback queue comprising the item of media content and generate a new playback queue comprising the one or more items of the available media content corresponding to the second user selection.

7. The method of claim 1, wherein the media archive is associated with another user.

8. A computer-program product, embodied on a non-transitory computer-readable medium, that, when executed by a server comprising a processor, causes the server to perform operations comprising:
   receiving, from a mobile communications device associated with a user, a first request to browse a media archive comprising one or more categories of media content;
   receiving, from the mobile communications device, a first user selection of a category from the one or more of the categories of media content;
   receiving, from the mobile communications device, a second request to initiate management of a playback queue, the playback queue comprising an item of media content positioned at the front of the playback queue;
   generating responsive to the second request to initiate management of the playback queue, a media listing corresponding to available media content associated with the category;
   receiving, from the mobile communications device, a second user selection of one or more items of the available media content associated with the category from the media listing, wherein the second user selection is indicative of a third request to add the one or more items of the available media content associated with the category to the playback queue;
   presenting, to the mobile communications device, one or more playback queue options for the one or more items of the available media content corresponding to the second user selection, wherein the one or more playback queue options comprise a first playback queue option to insert, in the playback queue, the one or more items of the available media content corresponding to the second user selection before the item of media content positioned at the front of the playback queue;

receiving, from the mobile communications device, a third user selection of the first playback queue option of the one or more playback queue options; and in response to receiving the third user selection of the first playback queue option, generating an updated playback queue comprising the one or more items of the available media content corresponding to the second user selection inserted before the item of the media content previously positioned at the front of the playback queue, and suspending play of the item of the media content previously positioned at the front of the playback queue for play of the one or more items of the available media content corresponding to the second user selection.

9. The computer-program product of claim 8, wherein the operations further comprise:

determining whether the second user selection of the one or more items of the available media content associated with the category from the media listing has ended; and in response to determining that the second user selection of the one or more items of the available media content associated with the category from the media listing has ended, presenting the one or more playback queue options for the one or more items of the available media content corresponding to the second user selection.

10. The computer-program product of claim 9, wherein determining whether the second user selection of the one or more items of the available media content associated with the category from the media listing has ended comprises receiving a user input indicating the second user selection of the one or more items of the available media content associated with the category from the media listing has ended.

11. The computer-program product of claim 8, wherein the one or more playback queue options for the one or more items of the available media content corresponding to the second user selection further comprises a second playback queue option to insert, in the playback queue, the one or more items of the available media content corresponding to the second user selection after the item of media content positioned at the front of the playback queue, wherein selection of the second playback queue option causes the one or more items of the available media content corresponding to the second user selection to play after play of the item of media content positioned at the front of the playback queue is complete.

12. The computer-program product of claim 8, wherein the one or more playback queue options for the one or more items of the available media content corresponding to the second user selection further comprises a second option to append the one or more items of the available media content corresponding to the second user selection to an end of the playback queue.

13. The computer-program product of claim 8, wherein the one or more playback queue options for the one or more items of the available media content corresponding to the second user selection further comprises a second option to discard the playback queue and generate a new playback queue comprising the one or more items of the available media content corresponding to the second user selection.

14. The computer-program product of claim 8, wherein the media archive is associated with another user.

15. A server comprising:

a processor; and a memory storing instructions that, when executed by the processor, cause the processor to perform operations comprising receiving, from a mobile communications device associated with a user, a first request to browse a media archive comprising one or more categories of media content, receiving, from the mobile communications device, a first user selection of a category from the one or more categories of media content, receiving, from the mobile communications device, a second request to initiate management of a playback queue, the playback queue comprising an item of media content positioned at the front of the playback queue, generating response to the second request to initiate management of the playback queue, a media listing corresponding to available media content associated with the category, receiving, from the mobile communications device, a second user selection of one or more items of the available media content associated with the category from the media listing wherein the second user selection is indicative of a third request to add the one or more items of the available media content associated with the category to the playback queue, presenting, to the mobile communications device, one or more playback queue options for the one or more items of the available media content corresponding to the second user selection, wherein the one or more playback queue options comprise a first playback queue option to insert, in the playback queue, the one or more items of the available media content corresponding to the second user selection before the item of media content positioned at the front of the playback queue, receiving, from the mobile communications device, a third user selection of the first playback queue option of the one or more playback queue options, and in response to receiving the third user selection of the first playback queue option, generating an updated playback queue comprising the one or more items of the available media content corresponding to the second user selection inserted before the item of the media content previously positioned at the front of the playback queue, and suspending play of the item of the media content previously positioned at the front of the playback queue for play of the one or more items of the available media content corresponding to the second user selection.

16. The server of claim 15, wherein the operations further comprise:

determining whether the second user selection of the one or more items of the available media content associated with the category from the media listing has ended; and in response to determining that the second user selection of the one or more items of the available media content associated with the category from the media listing has ended, presenting the one or more playback queue options for the one or more items of the available content corresponding to the second user selection.

17. The server of claim 15, wherein the one or more playback queue options for the one or more items of the available media content corresponding to the second user selection further comprises a second playback queue option to insert, in the playback queue, the one or more items of the available media content corresponding to the second user selection after the item of media content positioned at the front of the playback queue, wherein selection of the second playback queue option causes the one or more items of the available media content corresponding to the second user selection to play after play of the item of media content positioned at the front of the playback queue is complete.

18. The server of claim 15, wherein the one or more playback queue options for the one or more items of the available media content corresponding to the second user selection further comprises a second playback queue option to append the one or more items of the available media content corresponding to the second user selection to an end of the playback queue.

* * * * *